Aug. 24, 1926.
S. O. TILTON
1,597,217
SPEED SIGNAL FOR MOTOR VEHICLES
Filed August 23, 1922   2 Sheets-Sheet 1
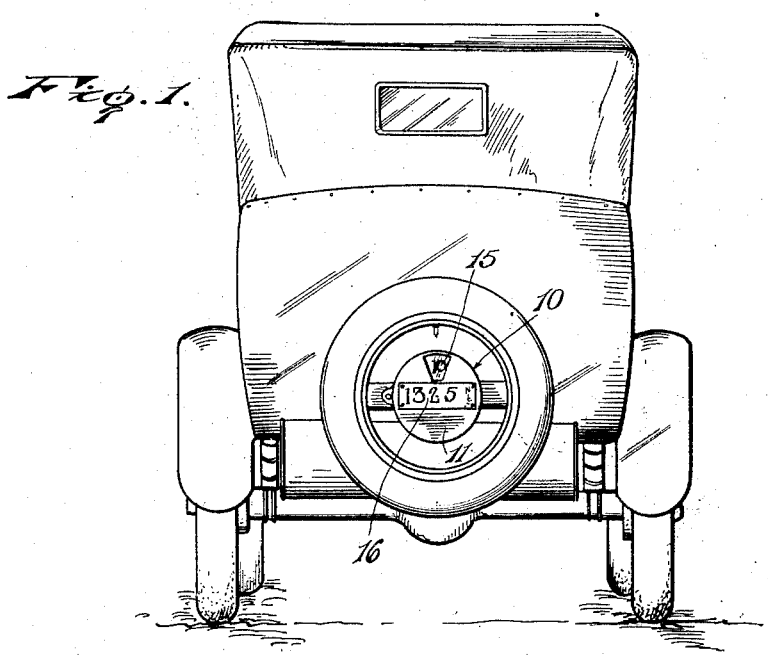
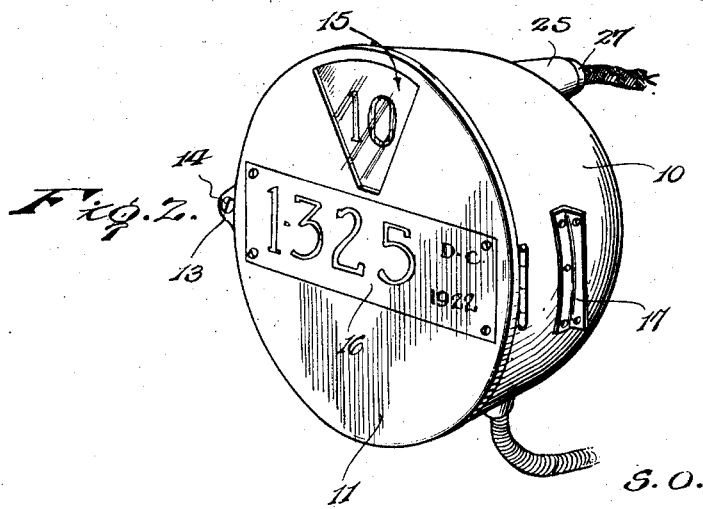
Inventor
S. O. Tilton.
By Lacy & Lacy, Attorneys Aug. 24, 1926.
S. O. TILTON
1,597,217
SPEED SIGNAL FOR MOTOR VEHICLES
Filed August 23, 1922    2 Sheets—Sheet 2
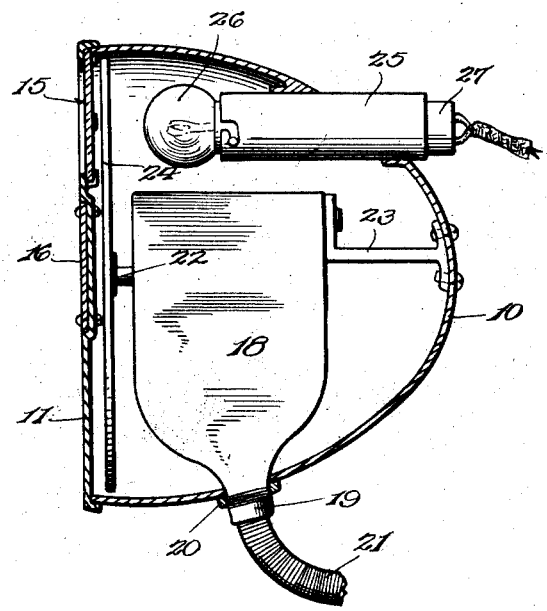
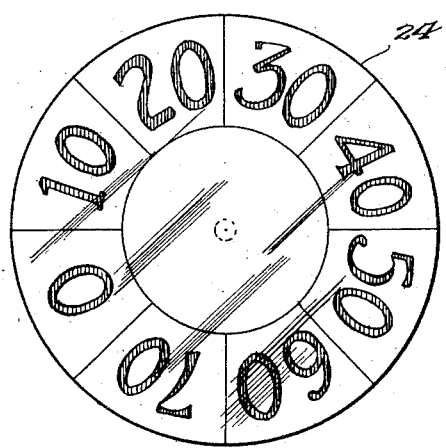
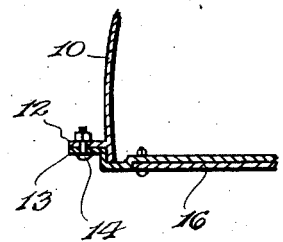
Inventor
S. O. Tilton.
By Lacy & Lacy, Attorneys Patented Aug. 24, 1926.

1,597,217

UNITED STATES PATENT OFFICE.

SAMUEL OLALA TILTON, OF HONOLULU, TERRITORY OF HAWAII.

SPEED SIGNAL FOR MOTOR VEHICLES.

Application filed August 23, 1922. Serial No. 583,845.

This invention relates to an improved speed signal for motor vehicles and seeks, as one of its principal objects, to provide a device of this character for visibly signaling the speed of a vehicle as the vehicle progresses so that a party guilty of infraction of speed laws may thus be readily apprehended.

The invention has as a further object to provide a device whereby pedestrians or an officer of the law may readily determine the speed of a vehicle as the vehicle passes by, whereby argument with the driver as to the exact speed attained may be eliminated.

And the invention has as a still further object to provide a device which may be readily applied and which will be well adapted for a wide range of use.

Other and incidental objects will appear hereinafter.

In the drawings:—

Figure 1 is a rear elevation showing my improved device applied to a conventional motor vehicle, Figure 2 is a perspective view showing the device in detail, Figure 3 is a vertical sectional view through the device.

Figure 4 is a detail elevation showing the signaling disc of the device, and

Figure 5 is a fragmentary sectional view showing the manner in which the door of the casing of the device is held closed and illustrating the manner in which a license plate may be mounted upon the door.

In carrying the invention into effect, I employ a casing 10 which, as best shown in Figure 3, is preferably shaped to provide a reflector and closing the casing at its forward end is a door 11 hinged upon the casing. At one side the casing is, as shown in detail in Figure 5, formed with a stop lug 12 and extending from the door is an ear 13 abutting said lug, the ear and lug removably receiving a bolt 14 therethrough securing the door closed. At its upper side the door is provided with a segmental sight window 15 below which the door is pressed in to define a transversely directed recess adapted to accommodate a license plate, as conventionally illustrated at 16, and mounted upon the sides of the casing are vertically disposed cleats or angle plates 17 by which the casing may, as suggested in Figure 1, be mounted at the rear of a vehicle. The vehicle is, of course, conventionally shown.

Housed within the casing 10 is an appropriate speedometer including a casing 18 having a reduced neck 19 threaded through a flange 20 at the lower side of the casing to receive an appropriate flexible drive shaft 21 and extending from the casing is a dial shaft 22, the casing 18 being removably secured at its upper end by a brace 23. The drive shaft 21 will, of course, be suitably driven by one of the wheels of the vehicle for rotatably advancing the dial shaft 22 in proper ratio and mounted on said shaft is a transparent signaling dial 24. This dial may be formed of celluloid or other approved material and imposed upon the forward face of the dial at its margin are suitable numbers arranged in successive segmental spaces upon the dial. The figures of these numbers are relatively large so as to be readily readable at a distance and, of course, the speedometer will be so adjusted that when the vehicle attains any given speed, the dial will be turned to a position displaying the number indicating the miles per hour of such speed at the sight window 15 in the door of the signal casing. Thus, the dial will serve to signal the speed of the vehicle in such manner that pedestrians or an officer of the law may readily read the signal as the vehicle passes by. Formed on the casing 10 at its upper side is a socket tube 25 extending into the casing and mounted in the inner end of said tube is a lamp 26 while at its outer end the tube receives a plug 27 from which extend suitable circuit wires for supplying current to the lamp. Accordingly, at night, the signaling dial may be illuminated so as to be readily visible.

Having thus described the invention, what is claimed as new is:—

A speed signal for motor vehicles comprising a casing open at one end and having an annular wall provided in its lower portion with an opening, a speedometer in said casing including a vertically disposed housing having a tapered lower end portion terminating in a threaded neck passed outwardly through the opening in said casing and removably secured therein, a rotary drive shaft for the speedometer extending outwardly through said neck, a rotary shaft extending from said housing towards the open end of said casing, a closure for the open end of said casing provided with a sight opening, a transparent cover for said sight opening, a dial carried by the outer end portion of the last-mentioned shaft adjacent said closure and rotating with the shaft and provided with indicating marks moved into registry with the sight opening of the closure as the dial is rotated, a bracket rigid with said housing and secured to said casing, and a socket extending through the wall of the casing over said housing towards the sight opening and having its inner end portion adapted to receive an illuminating bulb.

In testimony whereof I affix my signature.

SAMUEL OLALA TILTON. [L. S.]